UNITED STATES PATENT OFFICE.

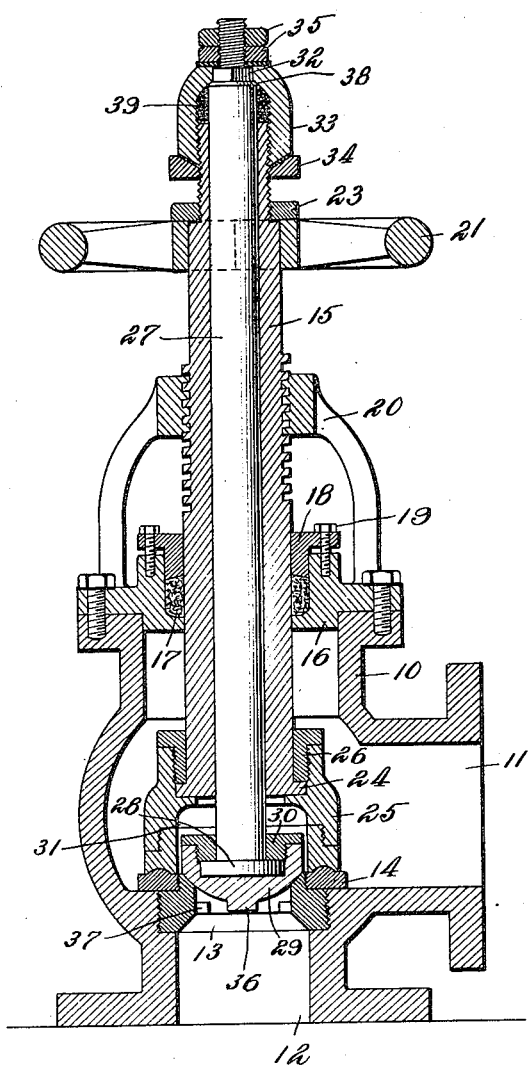

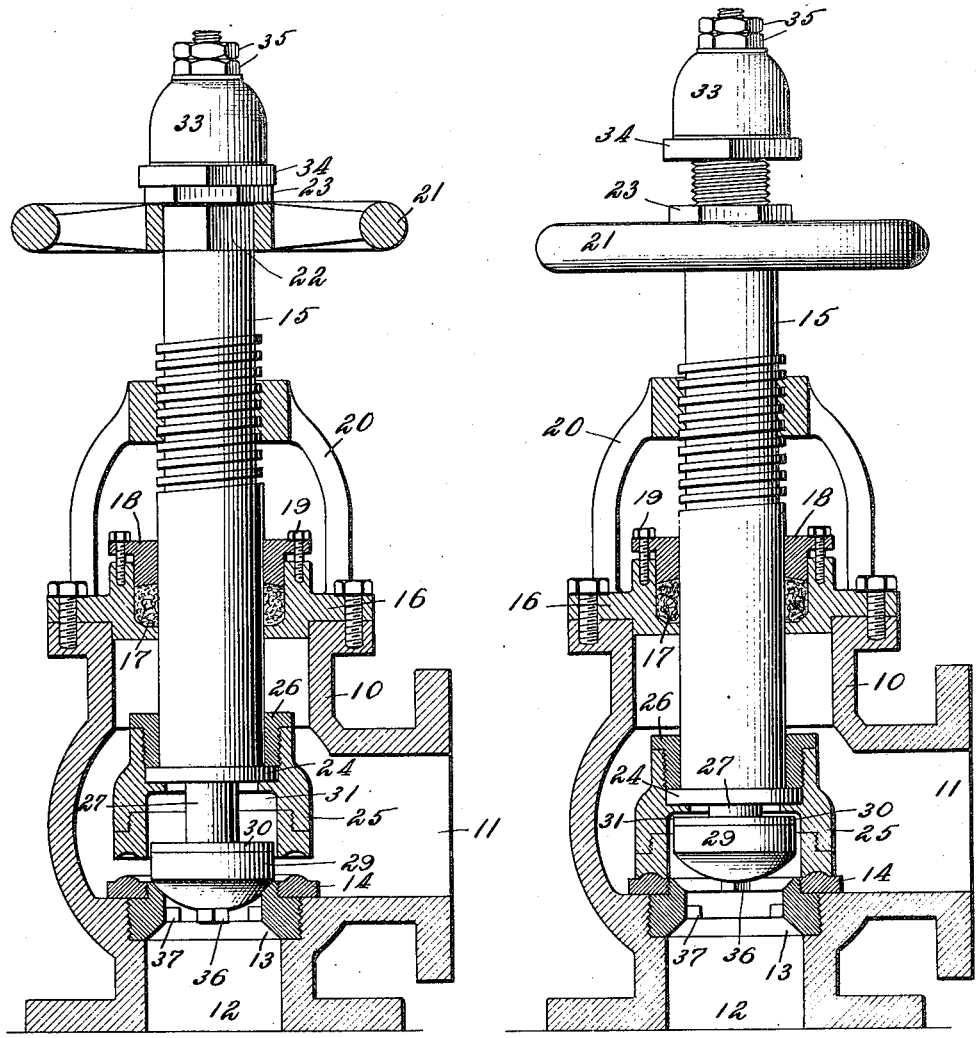

OTTO J. BERGO, OF NORFOLK, VIRGINIA, ASSIGNOR OF ONE-HALF TO THOMAS J. WHITE, OF NORFOLK, VIRGINIA.

BLOW-OFF VALVE.

1.166,884.   Specification of Letters Patent.   Patented Jan. 4, 1916.

Application filed June 1, 1914. Serial No. 842,093.

*To all whom it may concern:*

Be it known that I, OTTO J. BERGO, a citizen of the United States, residing at Norfolk, in the county of Norfolk and State of Virginia, have invented new and useful Improvements in Blow-Off Valves, of which the following is a specification.

This invention relates to valves, and has particular reference to that character of valve known as blow-off valves used particularly in connection with steam boilers.

An object of this invention is to provide a valve which will insure the closing of the same under practically all conditions. In valves of this type heretofore invented no provision was made for taking care of the scale and other sediment accumulating in boilers and pipes, and which are by degrees carried into the valve casing. This scale or sediment lodges in the corners of the valve casing and accumulates about the valve seat to such an extent as to prevent the complete shutting off of the fluid passage through the valve.

Another object of the invention is to provide a valve casing with a passage therethrough having a plurality of valves and their respective seats controlling the single fluid passage, these valves being selectively or simultaneously controlled and operated by means of a single handle exterior of the valve casing.

In carrying out these objects the valve of this invention comprises, broadly, a casing having a fluid passage therethrough with an inner or small valve seat and a correspondingly small valve for said seat to close the fluid passage. A second and larger valve seat is arranged outside of the small valve seat and is provided with a correspondingly large valve which also closes the fluid passage. A handle is mounted upon the stem of the larger valve so as to raise and lower the same. The inner valve has a stem adjustably connected to the larger stem whereby the inner valve may be operated simultaneously with the larger valve, may be operated in advance thereof so as to seat prior to the complete closing movement of the larger valve, or may be adjusted to admit the larger valve closing prior to the complete closing movement of the inner valve.

The above and other objects and advantages of this invention will more fully appear from the following detail disclosure of the present embodiment of this invention, the same being shown in the accompanying drawings wherein—

Figure 1 is a vertical central section taken through the device showing the valves closed and adjusted for simultaneous operation. Fig. 2 is a similar view showing the inner valve closed and the stems adjusted to operate the inner valve. Fig. 3 is a similar view disclosing the outer valve closed and the stems adjusted to operate the outer valve only.

Referring to these drawings 10 designates a valve casing having the lateral inlet port 11 and the bottom outlet port 12. Located at the top of the outlet port 12 is an annular valve seat 13 counter-sunk in the bottom of the valve casing 10 and detachably secured in place, preferably by means of threads as shown.

The valve seat 13 is provided with an upstanding reduced portion externally threaded to receive the internally threaded outer valve seat 14. The valve seat 14 threaded over the inner valve seat 13 bears against the bottom of the valve casing 10 and the top of the inner valve seat 13. An outer stem 15 is mounted in the casing 10 for rotation and also for vertical movement. The stem 15 passes through the top 16 of the casing which latter is recessed or counter-bored about the valve stem 15 to receive a suitable packing 17 held in place by a gland 18 forced against the packing in any suitable manner as by the headed bolts 19. The stem 15 has an exteriorly threaded portion near its upper end, which portion passes through an internally threaded yoke 20 carried upon the cap or top 16 of the valve casing and constituting a means for raising and lowering the valve stem when turned. Above the threaded portion the stem 15 is provided with a handle 21 fixed to the stem in any manner, as by the squared portion 22 on the stem, and a binding nut 23 located above the handle upon a reduced externally threaded extension of the stem. The nut 23 is turned down upon the stem against the handle to hold the latter upon the angled portion of the stem.

The stem 15 has an outstanding annular flange 24 upon its lower end. A valve 25, provided with a recess in its upper end receiving the lower extremity of the stem 15, is held to the stem by a nut 26 closely fitting the stem, engaging the flange 24 and having threaded connection with the inner wall of the valve 25. It is thus seen that the nut 26 holds the valve 25 upon the stem 15 and at the same time admits of the free turning of the stem within the valve.

A second or inner stem 27 is mounted for rotation in the outer stem 15, the inner stem having an annular flange 28 upon its lower end seated in a recess in the upper face of an inner or second valve 29, the latter being held for vertical movement with the stem 27 by means of a nut 30 engaging in threaded relation within the opening in the valve 29 and bearing against the flange 28. The outer valve 25 is adapted to rest upon the outer seat 14 and is chambered or hollowed out at its lower end as shown at 31 in the drawing, to receive the inner valve 29. The inner valve 29 is adapted to rest upon the inner valve seat 13 to close the fluid passage through the casing 10.

The upper end of the inner stem 27 is provided with an angular portion 32 receiving thereupon the upper end of a connecting cap 33 which latter is enlarged at its lower end and engages in threaded relation upon the externally threaded extension of the outer stem 15. The cap 33 is locked from movement upon the extension by a jam nut 34, the latter having preferably a beveled upper face engaging a correspondingly beveled face upon the lower end of the cap 33. The cap is held upon the upper end of the stem 27 by a pair of jam nuts 35 which engage over a reduced externally threaded projection of the inner valve stem 27.

For the purpose of facilitating the removal of the inner valve 29 from its stem, the valve is provided upon its lower end with a depending angular shank 36 adapted to receive a wrench or the like to hold the valve from rotation when its securing nut 30 is turned. The inner valve seat 13, which is threaded in the casing, has inwardly extending lugs 37 adapted to receive thereagainst a suitable tool for turning and removing the valve seat. In order to prevent any possible leakage between the inner and outer valve stems at their upper ends, the stem 27 is provided upon its upper end with a ground beveled face 38 engaging a correspondingly formed face within the top of the cap, and a packing 39 is placed within the top of the cap for engagement about the inner stem 27 and against the upper extremity of the outer stem 15.

When the parts are adjusted as shown in Fig. 1, and the handle turned the outer valve stem 15 is turned through the yoke 20, raising not only the valve stem 15 and its valve 25 but also the inner valve stem 27 and its valve 29.

When the device is adjusted as shown in Fig. 2, it will be noted that the cap 33 and its jam nut 34 are moved down toward the handle 21, such adjustment moving the inner stem 27 down through the outer stem and thus placing the inner valve 29 in advance of the outer valve 25. Thus, when the handle 21 is turned the stem 15 is moved down within the casing and the inner valve 29 seats upon the inner valve seat 13 before the outer valve 25 completes its closing movement.

In Fig. 3 of the drawing is shown the reverse adjustment from that shown in Fig. 2, or wherein the connecting cap 33 is raised upon the outer stem extension to thus draw the inner stem 27 up within the outer stem and move the inner valve 29 up within the chamber 31 of the outer valve. The inner valve 29 is now held up within the outer valve whereupon the latter is first brought to its seat when the handle is turned, such position being shown in Fig. 3.

What is claimed is—

In a blow-off valve the combination with a hollow stem, a valve on said stem, a second stem within said first stem, and a second valve on said second stem, of adjustable means between said stems, comprising a cap adapted to be secured on the end of said second stem and adapted to engage for relative movement with said first stem, means for locking said cap against movement on said second stem, and a packing within said cap between said stems.

In testimony whereof I have hereunto set my hand in presence of two subscribing witnesses.

OTTO J. BERGO.

Witnesses:
REGINALD J. B. PAGE,
W. K. FENTRESS.